(12) United States Patent
Kuwabara

(10) Patent No.: US 10,523,827 B2
(45) Date of Patent: Dec. 31, 2019

(54) INFORMATION PROCESSING DEVICE AND INFORMATION PROCESSING SYSTEM

(71) Applicant: FUJITSU LIMITED, Kawasaki-shi, Kanagawa (JP)

(72) Inventor: Hiroshi Kuwabara, Suginami (JP)

(73) Assignee: FUJITSU LIMITED, Kawasaki (JP)

( * ) Notice: Subject to any disclaimer, the term of this patent is extended or adjusted under 35 U.S.C. 154(b) by 63 days.

(21) Appl. No.: 15/616,030

(22) Filed: Jun. 7, 2017

(65) Prior Publication Data

US 2018/0007216 A1    Jan. 4, 2018

(30) Foreign Application Priority Data

Jul. 4, 2016  (JP) ................................. 2016-132896

(51) Int. Cl.
| | | |
|---|---|---|
| *G06F 15/16* | (2006.01) | |
| *H04N 1/00* | (2006.01) | |
| *G06F 3/0488* | (2013.01) | |
| *G06F 3/0481* | (2013.01) | |
| *G06F 3/0484* | (2013.01) | |

(52) U.S. Cl.
CPC ....... *H04N 1/00209* (2013.01); *G06F 3/0484* (2013.01); *G06F 3/04812* (2013.01); *G06F 3/04883* (2013.01); *G06F 3/04886* (2013.01)

(58) Field of Classification Search
CPC ............ H04N 1/00209; G06F 3/04812; G06F 3/04883; G06F 3/0484
USPC ....................................................... 709/205
See application file for complete search history.

(56) References Cited

U.S. PATENT DOCUMENTS 5,568,603 A * 10/1996 Chen .................. G06F 3/04845
                                                    715/784
8,743,022 B2 * 6/2014 Masuda ................ G06F 3/1454
                                                    345/2.2
9,857,969 B2 * 1/2018 Fujimori ............. G06F 3/04883
(Continued)

FOREIGN PATENT DOCUMENTS

JP         6-51928 A    2/1994
JP     2014-52690 A    3/2014

OTHER PUBLICATIONS

Jianying Hu, M. K. Brown and W. Turin, "HMM based online handwriting recognition," in IEEE Transactions on Pattern Analysis and Machine Intelligence, vol. 18, No. 10, pp. 1039-1045, Oct. 1996. (Year: 1996).*

*Primary Examiner* — Taylor A Elfervig
(74) *Attorney, Agent, or Firm* — Westerman, Hattori, Daniels & Adrian, LLP; John P. Kong

(57) ABSTRACT

An information processing device includes a processor configured to receive image information, display an image on the display device, receive a first input signal, display a pointer on a position corresponding to the first input signal, determine whether the position of the pointer is included in a first area of the image, when the position of the pointer is not included in the first area of the image, transmit, to a terminal device, position information and first mode information, and when the position of the pointer is included in the first area, transmit, to the terminal device, the position information and second mode information, receive a second input signal, and transmit, to the terminal device, operation information indicating an operation specified by the second input signal in a state in which the position is included in the first area.

12 Claims, 7 Drawing Sheets

(56) References Cited

U.S. PATENT DOCUMENTS

| | | | |
|---|---|---|---|
| 2010/0241956 A1* | 9/2010 | Matsuda | G06F 3/0488 |
| | | | 715/702 |
| 2013/0176212 A1* | 7/2013 | Nan | G06F 3/033 |
| | | | 345/157 |
| 2013/0179781 A1* | 7/2013 | Nan | G06F 3/0482 |
| | | | 715/711 |
| 2014/0028613 A1* | 1/2014 | Hwang | G06F 3/1454 |
| | | | 345/174 |
| 2014/0063179 A1 | 3/2014 | Kawano | |
| 2014/0085200 A1* | 3/2014 | Ito | G06F 3/016 |
| | | | 345/157 |
| 2016/0117140 A1* | 4/2016 | Ikeda | G06F 3/1454 |
| | | | 715/753 |
| 2016/0124606 A1* | 5/2016 | Lim | G06F 3/04812 |
| | | | 715/728 |
| 2016/0188148 A1* | 6/2016 | Lee | H04N 5/4403 |
| | | | 715/719 |
| 2016/0334984 A1* | 11/2016 | Ikeda | G06F 3/04883 |
| 2017/0249764 A1* | 8/2017 | Fujii | H04M 1/72519 |

* cited by examiner

INFORMATION PROCESSING DEVICE AND INFORMATION PROCESSING SYSTEM

CROSS-REFERENCE TO RELATED APPLICATION

This application is based upon and claims the benefit of priority of the prior Japanese Patent Application No. 2016-132896, filed on Jul. 4, 2016, the entire contents of which are incorporated herein by reference.

FIELD

The embodiments discussed herein are related to an information processing device and an information processing system.

BACKGROUND

Recent years, in a facility inspection in a factory, a worker performing the inspection wears a head mounted display (HMD) and a terminal device, and performs the inspection work while referring to a work instruction or a manual. In addition, it is proposed that a supporter performing support for the worker gives an instruction by sharing an image on a screen of the terminal device and remotely controls the terminal device using an information processing device coupled to the worker's terminal device via a network. In this case, the supporter can switch the modes between a handwriting mode in which the instruction is written on the sharing image on the screen by handwriting and an operation mode in which the terminal device is remotely controlled. Japanese Laid-open Patent Publication No. 2014-052690 and Japanese Laid-open Patent Publication No. 6-051928 are samples of the background art literatures.

SUMMARY

According to an aspect of the invention, an information processing device configured to communicate with a terminal device, the information processing device includes an input device, a display device and a processor coupled to the input device and the display device and configured to receive, from the terminal device, image information, display an image on the display device based on the image information, receive, by the input device, a first input signal, display, on the image displayed on the display device, a pointer on a position corresponding to the first input signal, determine whether the position of the pointer is included in a first area of the image, when the position of the pointer is not included in the first area of the image, transmit, to the terminal device, position information indicating the position of the pointer and first mode information indicating that a control mode by the information processing device for the image on the terminal device is a first mode, and when the position of the pointer is included in the first area, transmit, to the terminal device, the position information and second mode information indicating that the control mode is a second mode, receive, by the input device, a second input signal, and transmit, to the terminal device, operation information indicating an operation specified by the second input signal in a state in which the position is included in the first area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, in some cases, the switching operation between the handwriting mode and the operation mode may become complicated such as a case where the supporter repeats the instruction writing and remote control. Therefore, when the supporter performs support for the worker, in some cases, the supporter feels a burden in switching operation between the handwriting mode and the operation mode.

Embodiment 1

Figure 1:
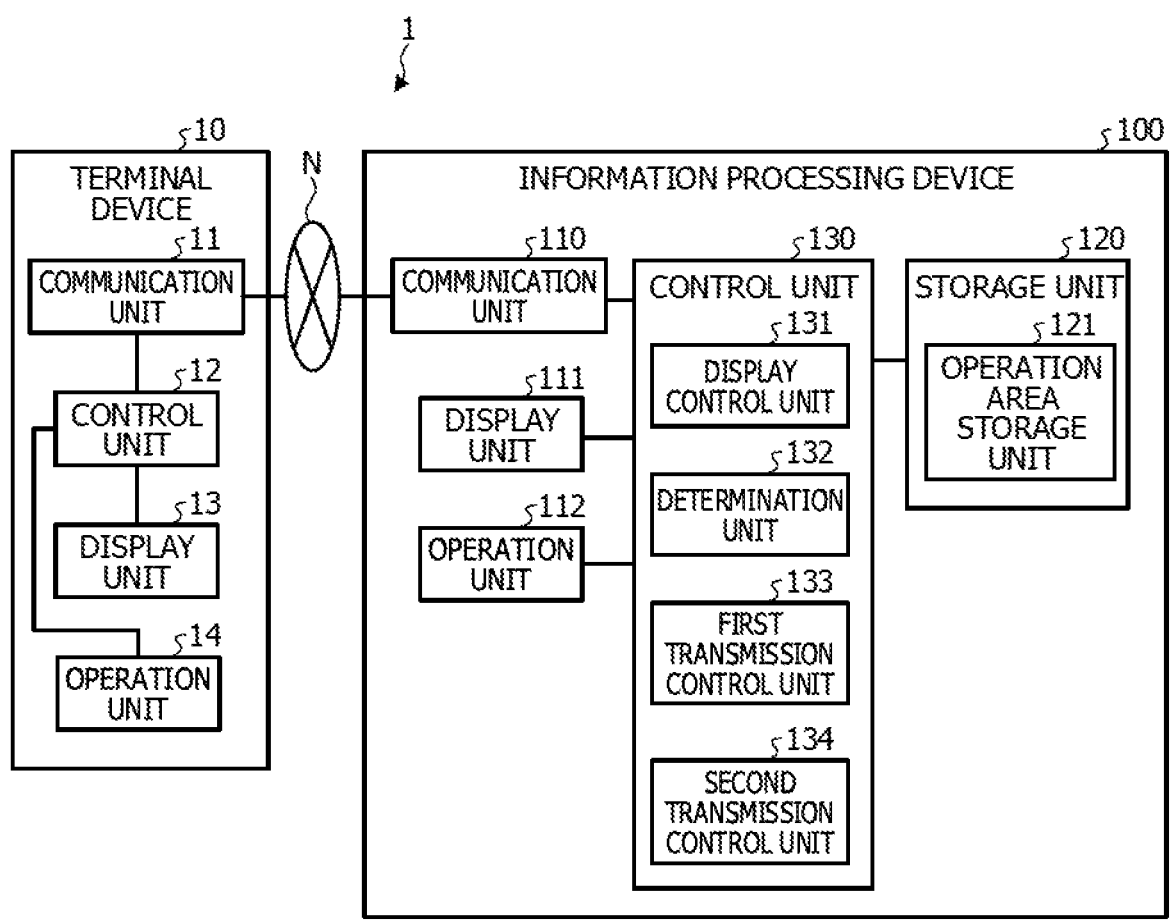
FIG. 1 is a block diagram illustrating an example of a configuration of an information processing system in an embodiment 1.

FIG. 1 is a block diagram illustrating an example of a configuration of an information processing system in an embodiment 1. An information processing system 1 in FIG. 1 includes a terminal device 10 and an information processing device 100. In FIG. 1, a case where the system has one terminal device 10 and one information processing device 100 is illustrated. However, the number of terminal device 10 and the information processing devices 100 is not limited, and thus, the information processing system 1 may include arbitrary number of terminal devices 10 and the information processing devices 100.

The terminal device 10 and the information processing device 100 are mutually communicably coupled to each other via a network N. In the network N, any arbitrary type of communication network such as a local area network (LAN) or a virtual private network (VPN) including the Internet can be adopted regardless of wired or wireless.

The information processing system 1 is an example of a system that performs a remote support such as giving an instruction or remotely controlling the terminal device 10 between the worker's terminal device 10 and the supporter's information processing device 100 by the image sharing on the screen of the terminal device 10. The terminal device 10 is an information processing device for the worker performing the inspection to wear together with the HMD and to perform an inspection work while referring to a work instruction and a manual. The information processing device 100 is an information processing device used by the supporter performing a support for the worker, and is an information processing device that gives the instruction or remotely controls the terminal device 10 between the worker's terminal device 10 and the supporter's information processing device 100 itself by the image sharing on the screen of the terminal device 10.

When an operation to the input device is received, the information processing device 100 superimposes a pointer on a position corresponding to the received operation on the image displayed on a display unit. The information processing device 100 determines whether or not the position of the superimposed pointer is included in an area of the operation component included in the image. In a case where the position of the pointer is not included in the area of the operation component, the information processing device 100 transmits position information of the pointer and handwriting mode information indicating that the mode is the handwriting mode to the terminal device 10. In a case where the position of the pointer is included in the area of the operation component, the information processing device 100 transmits the position information of the pointer and operation mode information indicating the operation mode to the terminal device 10. When the position of the pointer is included in the area of the operation component, if a specific operation by the input device is received, the information processing device 100 transmits information indicating the received specific operation to the terminal device 10. In this way, the information processing device 100 can reduce the operational burden in the switching operation between the handwriting mode and the operation mode.

Next, a configuration of the terminal device 10 will be described. As illustrated in FIG. 1, the terminal device 10 includes a communication unit 11, a control unit 12, a display unit 13, and an operation unit 14. The terminal device 10 may include functional units such as various input devices and voice output devices in addition to the functional units illustrated in FIG. 1.

The communication unit 11 is realized by a communication module such as a wireless LAN or the like. The communication unit 11 is a communication interface that is wirelessly coupled to the information processing device 100 via the network N, and administrates the information communications with the information processing device 100. The communication unit 11 transmits the image on the screen input from the control unit 12 and operation area information to the information processing device 100. In addition, the communication unit 11 receives the position information of the pointer, mode information and event information from the information processing device 100. The communication unit 11 outputs the received position information of the pointer, the mode information, and the event information to the control unit 12.

The control unit 12 is realized by a program stored in an internal storage device being executed by a central processing unit (CPU) or a micro processing unit (MPU) with a RAM as a work area. In addition, the control unit 12 may be realized by an integrated circuit such as an application specific integrated circuit (ASIC) or a field programmable gate array (FPGA).

The control unit 12 receives an instruction to start the image sharing with the information processing device 100 from the worker who is a user of the terminal device 10 via the operation unit 14. When the instruction is received, the control unit 12 starts to transmit the image displayed on the screen of the display unit 13 in the terminal device 10 to the information processing device 100 via the communication unit 11 and the network N. That is, the control unit 12 starts to share the image on the screen with the information processing device 100. The control unit 12 may perform a bi-directional voice communications between the terminal device 10 and the information processing device 100 in addition to the image sharing on the screen.

In addition, the control unit 12 sets a handwriting area and the operation area on the image on the screen of the terminal device 10. The control unit 12 sets a certain area on the image on the screen as the operation area and another area as the handwriting area. The control unit 12 transmits the set operation area to the information processing device 100 via the communication unit 11 and the network N as the operation area information. In a case where the image on the screen in the terminal device 10 is changed and the operation area is changed, the control unit 12 transmits the changed operation area information to the information processing device 100 via the communication unit 11 and the network N.

The control unit 12 receives the position information of the pointer and the mode information from the information processing device 100 via the communication unit 11 and the network N. The control unit 12 causes one or more of the position and a shape of the pointer on the image on the screen based on the position information of the pointer and the mode information. For example, in a case where the pointer moves within the handwriting area in the handwriting mode, the control unit 12 causes the pointer indicating the handwriting mode to move within the handwriting area. In addition, for example, in a case where the pointer moves within the operation area in the operation mode, the control unit 12 causes the pointer indicating the operation mode to move within the operation area. Furthermore, for example, in a case where the pointer moves from the operation area to the handwriting area, the control unit 12 changes the pointer from the pointer indicating the operation mode to the pointer indicating the handwriting mode.

The control unit 12 receives the position information of the pointer, the mode information, and the event information from the information processing device 100 via the communication unit 11 and the network N. The control unit 12 determines whether or not the event information is received from the information processing device 100. In a case where the event information is not received, the control unit 12 continues to share the image on the screen including the movement of the pointer. In a case where the event information is received, the control unit 12 determines whether or not the received mode information is the operation mode. In a case where the mode information is the operation mode, the control unit 12 issues the received event information. In addition, the control unit 12 moves the pointer based on the received position information of the pointer. That is, for example, the control unit 12 performs an event of moving the pointer to a button for enlargement operation and pressing the button.

In a case where mode information is not the operation mode, that is, in a case where the mode information is the handwriting mode, the control unit 12 performs handwriting drawing based on the event information. That is, the control unit 12 moves the pointer based on the position information of the pointer and draws a line based on the event information, for example, the information indicating that a left click of a mouse is pressed.

When issuing of the event information or performing of the handwriting drawing is ended, the control unit 12 determines whether or not to end the image sharing with the information processing device 100. For example, the control unit 12 receives an ending instruction from the worker via the operation unit 14. In a case where the image sharing is ended, the control unit 12 ends the transmission control processing. In a case where the image sharing is not ended, the control unit 12 continues to share the image on the screen.

The display unit 13 is a display device for displaying various information items. The display unit 13 is a transmissive HMD in which an image is projected on a half mirror and the user can see outside landscape through the half mirror in addition to the image. The display unit 13 may be the HMD such as an immersive type, a video transmission type, a retinal projection type, or the like. In addition, the display unit 13 may be provided with, for example, a liquid crystal display or the like separately from the HMD. The image on the screen shared between the terminal device 10 and the information processing device 100 is an image displayed on the display unit 13.

The operation unit 14 is an input device that receives various operations from the worker who is the user of the terminal device 10. The operation unit 14 is realized by, for example, a touch panel or the like as the input device. In this case, the input device of the operation unit 14 may be integrated with the liquid crystal display which is an example of a display device of the display unit 13. The operation unit 14 outputs the operation input by the worker who is the user to the control unit 12 as the operation information. The operation unit 14 may be realized by a touch pad, a keyboard, a mouse, or the like.

Subsequently, a configuration of the information processing device 100 will be described. As illustrated in FIG. 1, the information processing device 100 includes a communication unit 110, a display unit 111, an operation unit 112, a storage unit 120, and a control unit 130. The information processing device 100 may include functional units such as various input devices or voice output devices in addition to the functional units illustrated in FIG. 1.

The communication unit 110 is realized by a communication module such as a wireless LAN or the like. The communication unit 110 is a communication interface that is wirelessly coupled to the terminal device 10 via the network N, and administrates the information communications with the terminal device 10. The communication unit 110 receives the image on the screen and the operation area information from the terminal device 10. The communication unit 110 outputs the received image on the screen and the operation area information to the control unit 130. In addition, the communication unit 110 transmits the position information of the pointer, the mode information and the event information input from the control unit 130 to the terminal device 10.

The display unit 111 is a display device for displaying various information items. The display unit 111 is realized by, for example, a liquid crystal display as a display device. The display unit 111 displays various screens such as a display screen input from the control unit 130 or the like.

The operation unit 112 is an input device that receives various operations from the supporter who is the user of the information processing device 100. The operation unit 112 is realized by, for example, a keyboard, a mouse, or the like as an input device. In addition, the operation unit 112 may use a pointing device such as a touch pad, a pen tablet and a digitizer as the input device. The operation unit 112 outputs the operation input from the user to the control unit 130 as the operation information. The operation unit 112 may be realized by a touch panel as an input device, and the display device of the display unit 111 and the input device of the operation unit 112 may be integrated.

The storage unit 120 is realized by, for example, a semiconductor memory device such as random access memory (RAM) and a flash memory, and a storage device such as a hard disk or an optical disk. The storage unit 120 includes an operation area storage unit 121. In addition, the storage unit 120 stores information used for processing in the control unit 130.

The operation area storage unit 121 stores the operation area on the screen in the terminal device 10, which is included in the operation area information received from the terminal device 10. The operation area storage unit 121 stores the operation area as the coordinates on the screen, for example.

The control unit 130 is realized by a program stored in an internal storage device being executed by a CPU or an MPU with a RAM as a work area. In addition, the control unit 130 may be realized by an integrated circuit such as an ASIC or an FPGA. The control unit 130 includes a display control unit 131, a determination unit 132, a first transmission control unit 133, and a second transmission control unit 134, and realizes the functions of information processing or performs the operation described below. The internal configuration of the control unit 130 is not limited to the configuration illustrated in FIG. 1, and other configuration may be used as long as the information processing described below is performed.

When the image sharing with the terminal device 10 is started, the display control unit 131 displays the image on the screen received from the terminal device 10 via the network N and the communication unit 110 on the display unit 111. In addition, when the operation area information is received from the terminal device 10 via the network N and the communication unit 110, the display control unit 131 stores the operation area included in the received operation area information in the operation area storage unit 121. In a case where the operation area is changed and new operation area information is received, the display control unit 131 updates the operation area in the operation area storage unit 121 as the operation area included in the received operation area information.

When position information according to the operation from the determination unit 132 is input, the display control unit 131 superimposes and displays the pointer on the position corresponding to the position information according to the operation on the image displayed on the display unit 111. That is, for example, when the operation for moving the pointer of the mouse is input on the image displayed on the display unit 111, the display control unit 131 moves and displays the pointer of the mouse according to the input operation. In other words, the display control unit 131 displays the image received from the terminal device 10 on the display unit 111, and superimposes the pointer on the position corresponding to the operation on the image.

The determination unit 132 monitors the position of the pointer input from the operation unit 112, that is, the input device. That is, when the operation to the input device is received, the determination unit 132 outputs the position information corresponding to the received operation to the display control unit 131. In addition, the determination unit 132 determines whether or not the input operation to the operation unit 112, that is, an event in the input device occurs. The event includes "PRESS" indicating an operation of pressing a button of the mouse with the combination of X and Y coordinates, and "RELEASE" indicating an operation of releasing the button of the mouse with the combination of X and Y coordinates as basic events, for example. In addition, the event includes "MOVE" indicating an operation of moving the mouse while "PRESS" with the combination of X and Y coordinates, and "CLICK" indicating an operation of performing the "PRESS" and RELEASE" with the combination of X and Y coordinates as application events, for example.

In a case where the event of the input device does not occur, the determination unit 132 determines whether or not the pointer is within the operation area based on the operation area in the operation area storage unit 121.

That is, the determination unit 132 determines whether or not the position of the superimposed pointer is included in the area of the operation component included in the image. In a case where the pointer is within the operation area, the determination unit 132 sets the mode to the operation mode. In a case where the pointer is within the operation area, the determination unit 132 sets the mode to the handwriting mode. The determination unit 132 outputs the position information of the pointer indicating the position of the pointer and the mode information indicating the set operation mode or the handwriting mode to the first transmission control unit 133. The determination unit 132 may output the position information of the pointer and the mode information periodically, for example, for every second to the first transmission control unit 133 regardless of the occurring of the event.

In a case where an event of the input device occurs, the determination unit 132 determines whether or not the event is within the operation area based on the position of the pointer where the event occurs and the operation area in the operation area storage unit 121. That is, the determination unit 132 determines whether or not the position of the superimposed pointer is included in the area of the operation component in the image. In a case where the event is within the operation area, the determination unit 132 sets the mode to the operation mode. In a case where the event is not within the operation area, the determination unit 132 sets the mode to the handwriting mode. The determination unit 132 outputs the position information of the pointer indicating the position of the pointer, the mode information indicating the set operation mode or the handwriting mode, and the event information indicating the content of the occurred event to the first transmission control unit 133.

When the mode is handwriting mode and in a case where the position of the pointer during the handwriting input is included in the area of the operation component, the determination unit 132 transmits the position information of the pointer and the handwriting mode information to the terminal device 10. That is, the determination unit 132 can avoid the operation of the button or the like on the unintended operation area caused by continuing the handwriting mode in a case where the position of the pointer during the handwriting input in the handwriting mode is moved from the handwriting area to the operation area.

When the position information of the pointer and the mode information are input from the determination unit 132, the first transmission control unit 133 transmits the input position information of the pointer and the mode information to the terminal device 10 via the communication unit 110 and the network N. When the position information of the pointer and the mode information are transmitted to the terminal device 10, the first transmission control unit 133 determines whether or not to end the image sharing with the terminal device 10. In a case where the image sharing is not ended, the first transmission control unit 133 continues to perform the image sharing. In a case where the image sharing is ended, the first transmission control unit 133 ends the transmission control processing.

In addition, when the pointer position information, the information and the event information are input from the determination unit 132, the first transmission control unit 133 transmits the input position information of the pointer and the mode information to the terminal device 10 via the communication unit 110 and the network N. Furthermore, the first transmission control unit 133 outputs the input event information to the second transmission control unit 134.

That is, in a case where the position of the pointer is not included in the area of the operation component, the first transmission control unit 133 transmits the position information of the pointer and the handwriting mode information indicating that the mode is the handwriting mode to the terminal device 10. In addition, in a case where the position of the pointer is included in the area of the operation component, the first transmission control unit 133 transmits the position information of the pointer and the operation mode information indicating that the mode is the operation mode to the terminal device 10.

When the event information is input from the first transmission control unit 133, the second transmission control unit 134 transmits the input event information to the terminal device 10 via the communication unit 110 and the network N. That is, when position of the pointer is included in the area of the operation component and if a specific operation through the input device is received, the second transmission control unit 134 transmits the information indicating the received specific operation to the terminal device 10. When the event information is transmitted to the terminal device 10, the second transmission control unit 134 determines whether or not to end the image sharing with the terminal device 10. In a case where the image sharing is not ended, the second transmission control unit 134 continues to perform the image sharing. In a case where the image sharing is ended, the second transmission control unit 134 ends the transmission control processing.

Figure 2:
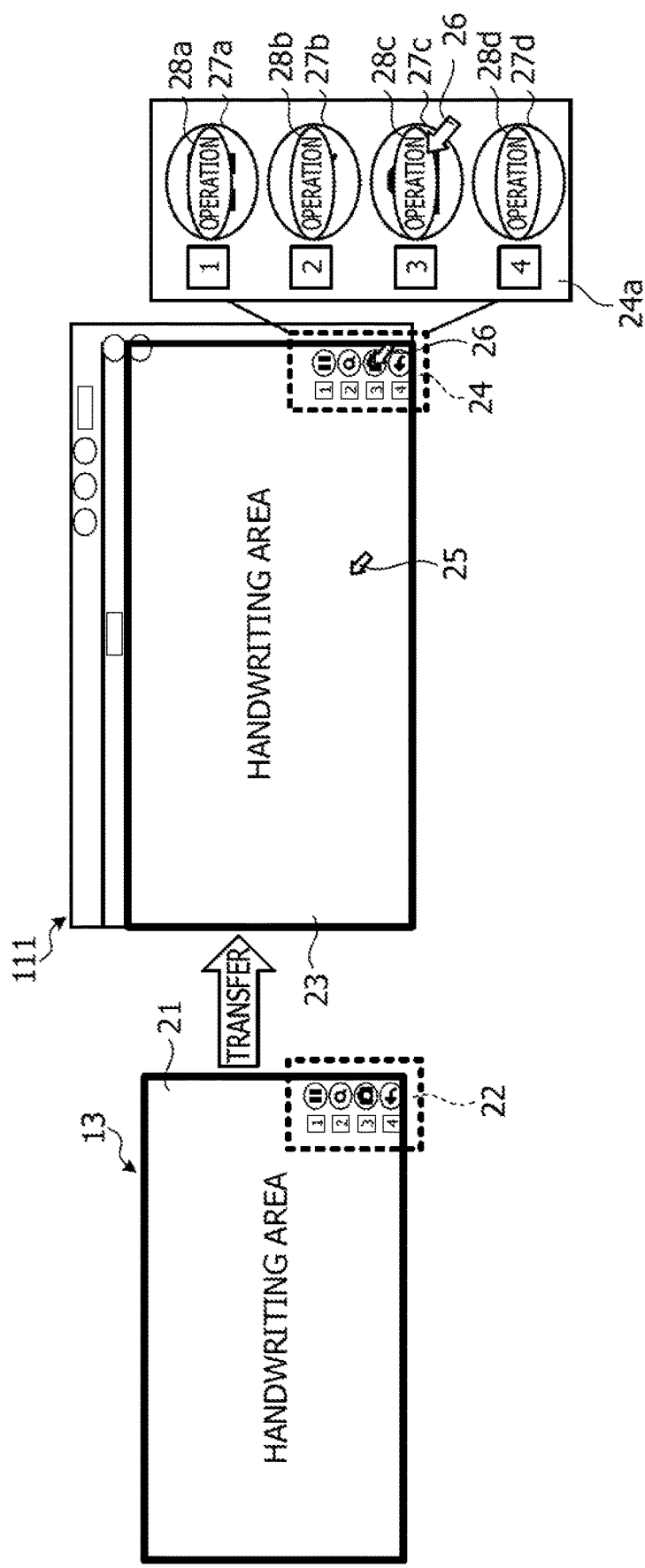
FIG. 2 is a diagram illustrating an example of image sharing and setting operation areas.

Here, the image sharing and the operation area will be described using FIG. 2. FIG. 2 is a diagram illustrating an example of the image sharing and setting operation areas. As illustrated in FIG. 2, the handwriting area 21 and the operation area 22 are set on the image on the screen on the display unit 13 in the terminal device 10. In the operation area 22, the button performing the operation corresponding to the cock is disposed. The image on the screen on the display unit 13 in the terminal device 10 transferred for being shared with the information processing device 100. In the information processing device 100 to which the image on the screen is transferred, the transferred image on the screen is displayed on the display unit 111.

In the example in FIG. 2, the handwriting area 23 corresponding to the handwriting area 21 and the operation area 24 corresponding to the operation area 22 are displayed. On another area on the display unit 111, non-shared images may be displayed. In addition, the pointers 25 and 26 corresponding to the operation received from the operation unit 112 are displayed on the shared image on the screen in the information processing device 100. The pointer 25 is an example of a position of the pointer within the handwriting area 23. The pointer 26 is an example of a position of the pointer within the operation area 24. In addition, in the operation area 24, for example, as illustrated in the operation area 24a, only the center portions of the operation buttons 27a to 27d may be the operation areas 28a to 28d. In this case, an erroneous operation can be avoided in the information processing device 100.

Figure 3:
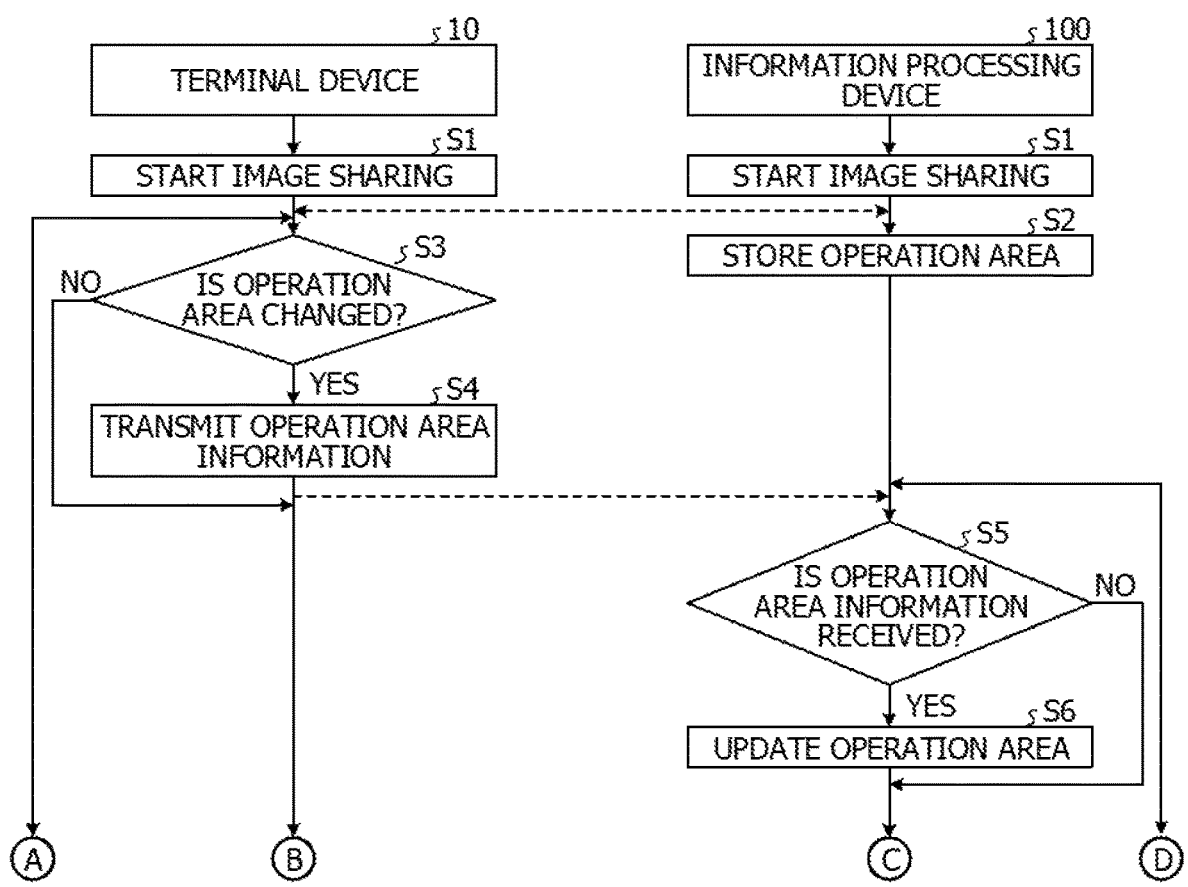
FIG. 3 is a sequence diagram illustrating an example of transmission control processing in the embodiment 1.
Figure 4:
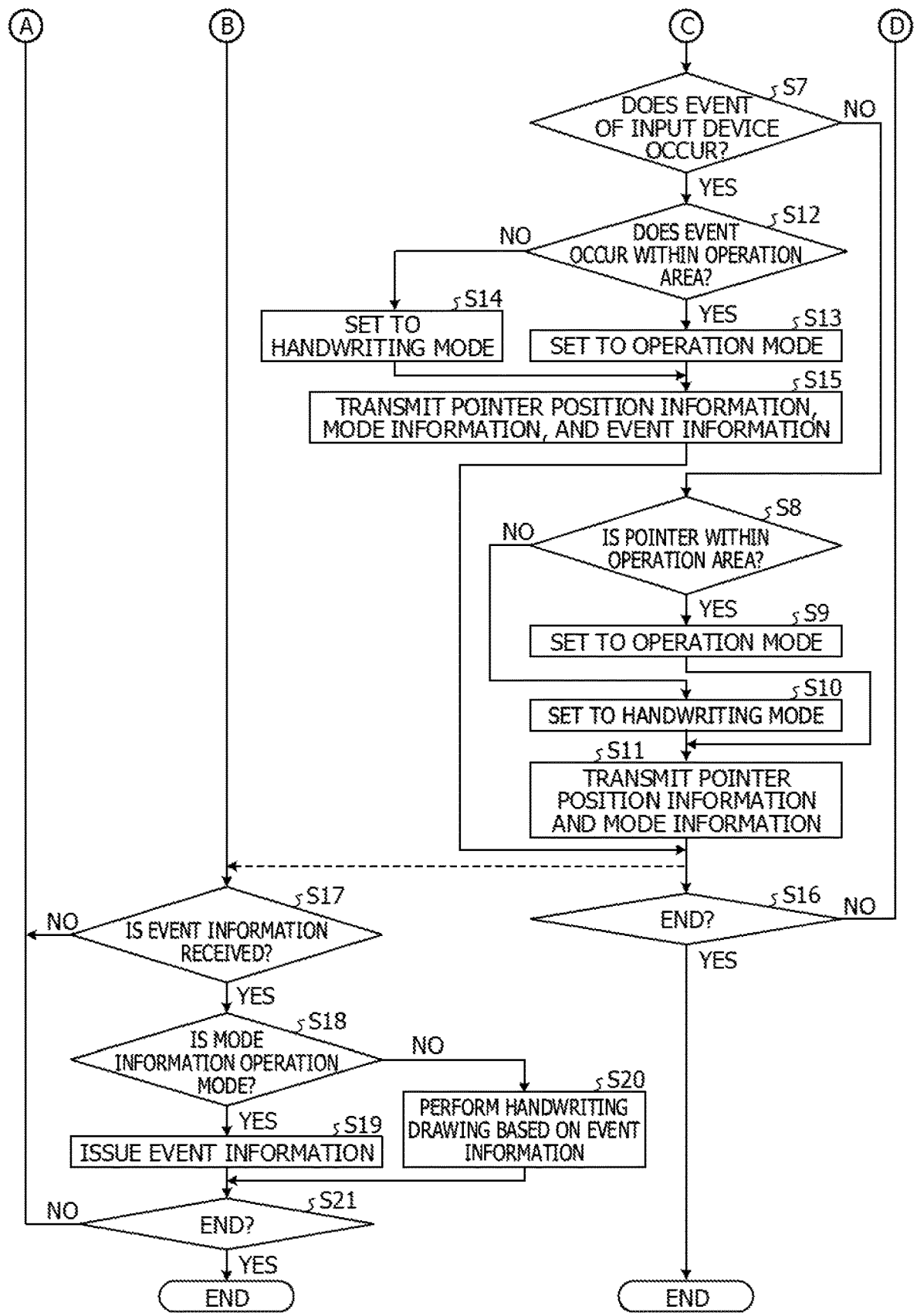
FIG. 4 is a sequence diagram illustrating an example of the transmission control processing in the embodiment 1.

Next, an operation of the information processing system 1 in the embodiment 1 will be described. FIG. 3 and FIG. 4 are sequence diagrams illustrating examples of transmission control processing in the embodiment 1.

The terminal device 10 of the information processing system 1 receives an instruction to start the image sharing with the information processing device 100 from the worker who is the user. The terminal device 10 starts sharing the image on the screen with the information processing device 100 (STEP S1).

In addition, the control unit 12 of the terminal device 10 sets the handwriting area and the operation area on the image on the screen of the terminal device 10. The control unit 12 transmits the set operation area to the information processing device 100 at the time of starting the image sharing as the operation area information.

When the image sharing with the terminal device 10 is started, the display control unit 131 of the information processing device 100 displays the image on the screen received from the terminal device 10 on the display unit 111. In addition, when the operation area information is received from the terminal device 10, the display control unit 131 stores the operation area included in the received operation area information in the operation area storage unit 121 (STEP S2).

The control unit 12 of the terminal device 10 determines whether or not the image on the screen in the terminal device 10 is changed and the operation area is changed (STEP S3). In a case where the operation area is changed (Yes in STEP S3), the control unit 12 transmits the operation area information corresponding to the changed operation area to the information processing device 100 (STEP S4), and the process proceeds to STEP S17. In a case where the operation area is not changed (No in STEP S3), the control unit 12 does not transmit the operation area information, and the process proceeds to STEP S17.

The display control unit 131 of the information processing device 100 determines whether or not the operation area information is received from the terminal device 10 (STEP S5). In a case where the operation area information is received (Yes in STEP S5), the display control unit 131 updates the operation area in the operation area storage unit 121 to the operation area included in the received operation area information (STEP S6), and the process proceeds to STEP S7. In a case where the operation area information is not received (No in STEP S5), the display control unit 131 does not update the operation area in the operation area storage unit 121, and the process proceeds to STEP S7.

When the operation to the input device is received, the determination unit 132 outputs the position information corresponding to the received operation to the display control unit 131. When the position information corresponding to the operation is input from the determination unit 132, the display control unit 131 displays the pointer on the position corresponding to the position information corresponding to the operation while being superimposed on the image displayed on the display unit 111. In addition, the determination unit 132 determines whether or not the event of the input device occurs (STEP S7). In a case where the event of the input device does not occur (No in STEP S7), the determination unit 132 determines whether or not the pointer is within the operation area based on the operation area in the operation area storage unit 121 (STEP S8).

In a case where the pointer is within the operation area (Yes in STEP S8), the determination unit 132 sets the mode to the operation mode (STEP S9). In a case where the pointer is not within the operation area (No in STEP S8), the determination unit 132 sets the mode to handwriting mode (STEP S10). The determination unit 132 outputs the position information of the pointer and the set mode information to the first transmission control unit 133.

When the position information of the pointer and the mode information are input from the determination unit 132, the first transmission control unit 133 transmits the input position information of the pointer and the mode information to the terminal device 10 (STEP S11), and the process proceeds to STEP S16.

The description is returned to STEP S7. In a case where the event of the input device occurs (Yes in STEP S7), the determination unit 132 determines whether or not the event is within the operation area based on the position of the pointer where the event occurs and the operation area in the operation area storage unit 121 (STEP S12). In a case where the event occurs within the operation area (Yes in STEP S12), the determination unit 132 sets the mode to the operation mode (STEP S13). In a case where the event does not occur within the operation area (No in STEP S12), the determination unit 132 sets the mode to the handwriting mode (STEP S14). The determination unit 132 outputs the position information of the pointer, the set mode information, and the event information to the first transmission control unit 133.

When the position information of the pointer, the mode information, and the event information are input from the determination unit 132, the first transmission control unit 133 transmits the input position information of the pointer and the mode information to the terminal device 10. Furthermore, the first transmission control unit 133 outputs the input event information to the second transmission control unit 134. When the event information is input from the first transmission control unit 133, the second transmission control unit 134 transmits the input event information to the terminal device 10 (STEP S15), and the process proceeds to STEP S16.

The first transmission control unit 133 or the second transmission control unit 134 determines whether or not to end the image sharing with the terminal device 10 (STEP S16). In a case where the first transmission control unit 133 or the second transmission control unit 134 does not end the image sharing (No in STEP S16), the process returns to STEP S5. In a case where the first transmission control unit 133 or the second transmission control unit 134 ends the image sharing (Yes in STEP S16), the transmission control processing ends.

The control unit 12 of the terminal device 10 receives the position information of the pointer, the mode information, and the event information from the information processing device 100. The control unit 12 determines whether or not the event information is received from the information processing device 100 (STEP S17). In a case where the event information is not received (No in STEP S17), the control unit 12 returns the process to STEP S3. That is, in a case where the position information of the pointer and the mode information are received from the information processing device 100, the control unit 12 reflects the position information of the pointer and the mode information on the screen of the display unit 13.

In a case where the event information is received (Yes in STEP S17), the control unit 12 determines whether or not the received mode information is the operation mode (STEP S18). In a case where the mode information is the operation mode (Yes in STEP S18), the control unit 12 issues the received event information (STEP S19), and the process proceeds to STEP S21.

In a case where the mode information is not the operation mode (No in STEP S18), control unit 12 performs the handwriting drawing based on the event information (STEP S20), and the process proceeds to STEP S21.

When the issuing of the event information or the performing of the handwriting drawing is ended, the control unit 12 determines whether or not to end the image sharing with the information processing device 100 (STEP S21). In a case where the image sharing is not ended (No in STEP S21), the control unit 12 returns the process to STEP S3. In a case where the image sharing is ended (Yes in STEP S21), the control unit 12 ends the transmission control processing. In this way, the information processing device 100 can reduce the operational burden in the switching operation between the handwriting mode and the operation mode.

As described above, when the operation to the input device is received, the information processing device 100 superimposes the pointer on the position corresponding to the received operation on the image displayed on the display unit 111. In addition, the information processing device 100 determines whether or not the position of the superimposed pointer is included in the area of the operation component in the image. In addition, in a case where the position of the pointer is not included in the area of the operation component, the information processing device 100 transmits the position information of the pointer and the handwriting mode information indicating that the mode is the handwriting mode to the terminal device 10. In addition, in a case where the position of the pointer is included in the area of the operation component, the information processing device 100 transmits the position information of the pointer and the operation mode information indicating that the mode is the operation mode to the terminal device 10. In addition, when the position of the pointer is included in the area of the operation component and if a specific operation by the input device is received, the information processing device 100 transmits the information indicating the received specific operation to the terminal device 10. As a result, it is possible to reduce the operational burden in the switching operation between the handwriting mode and the operation mode.

In addition, the information processing device 100 displays the image received from the terminal device 10 on the display unit 111 and superimposes the pointer on the position corresponding the operation on the image. As a result, the image sharing with the terminal device 10 can be performed and the operation can be performed on the shared image in the information processing device 100 side.

In addition, when the mode is handwriting mode and if the position of the pointer during the handwriting input is included in the area of the operation component, the information processing device 100 transmits the position information of the pointer and the handwriting mode information to the terminal device 10. As a result, it is possible to avoid the unintended operation during the handwriting input.

Embodiment 2

Figure 5:
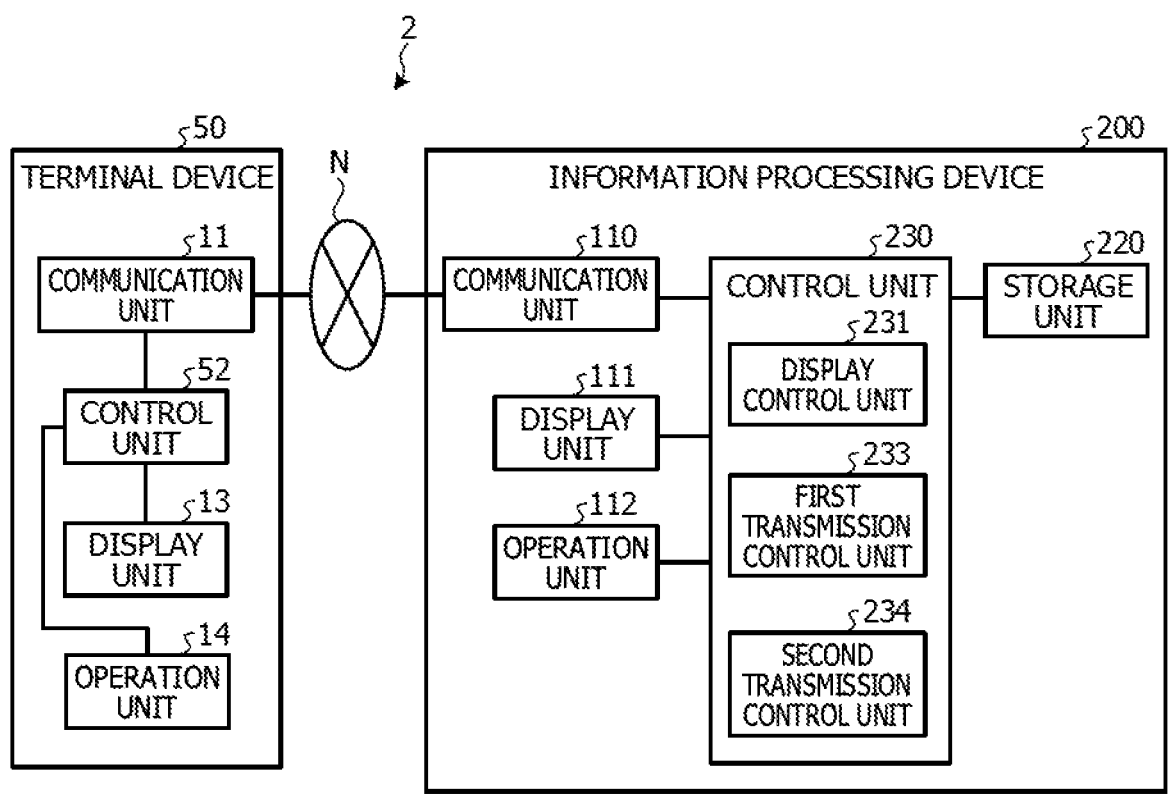
FIG. 5 is a block diagram illustrating an example of a configuration of an information processing system in an embodiment 2.

In the embodiment 1 described above, the handwriting mode and the operation mode are switched to and from each other according to the area of the screen. However, the handwriting mode and the operation mode may be switched to and from each other according to the input device, and the embodiment in this case will be described as the embodiment 2. FIG. 5 is a block diagram illustrating an example of a configuration of an information processing system in the embodiment 2. An information processing system 2 illustrated in FIG. 5 includes a terminal device 50 and an information processing device 200. The same reference signs will be given to the configuration same as the information processing system 1 in the embodiment 1, and the description thereof will not be repeated.

The terminal device 50 in the embodiment 2 includes a control unit 52 instead of the control unit 12 differently from the terminal device 10 in the embodiment 1.

Differently from the control unit 12, the control unit 52 does not perform the setting of the handwriting area and the operation area and transmission of the operation area information. Other processing items by the control unit 52 are similar to that by the control unit 12, and descriptions thereof will be omitted.

The operation unit 112 of the information processing device 200 in the embodiment 2 includes a touch pad as an input device for receiving, for example, a handwriting input, and includes a mouse as another input device. In addition, a storage unit 220 of the information processing device 200 does not include the operation area storage unit 121 differently from the storage unit 120 in the embodiment 1.

A control unit 230 of the information processing device 200 in the embodiment 2 includes a display control unit 231 instead of the display control unit 131 and does not include the determination unit 132 differently from the control unit 130 in the embodiment 1. In addition, the control unit 230 includes a first transmission control unit 233 and a second transmission control unit 234 instead of the first transmission control unit 133 and the second transmission control unit 134 differently from the control unit 130.

When the image sharing with the terminal device 50 is started, the display control unit 231 displays the image on the screen received from the terminal device 50 via the network N and the communication unit 110 on the display unit 111.

The display control unit 231 monitors the position of the pointer input from the operation unit 112, that is, the input device. In addition, the display control unit 231 determines whether or not the input operation to the operation unit 112, that is, the event of the input device occurs. In a case where the event of the input device does not occur, the display control unit 231 collects a type of the input device. The display control unit 231 determines whether or not the type of collected input device is the input device that receives the handwriting input, that is, a handwriting device.

In a case where the type is the handwriting device, the display control unit 231 superimposes and displays the pointer on the position corresponding to the operation on the image displayed on the display unit 111. That is, for example, when an operation for moving the handwriting input pointer is input to the image displayed on the display unit 111, the display control unit 231 moves the handwriting input pointer according to the input operation, and for example, draws a line to be displayed. In other words, when the operation to the input device for receiving the handwriting input is received, the display control unit 231 superimposes the pointer on the position corresponding to the received operation on the image displayed on the display unit 111. In addition, the display control unit 231 sets the mode information to the handwriting mode indicating the mode is the handwriting mode according to the fact that the operation to the handwriting device is received.

In a case where the type is not the handwriting device, that is, another input device, the display control unit 231 superimposes and displays the pointer on the position corresponding to the operation on the image displayed on the display unit 111. That is, when an operation for moving the pointer of the mouse is input on the image displayed on the display unit 111, the display control unit 231 moves and displays the pointer of the mouse according to the input operation. In other words, when an operation to another input device is received, the display control unit 231 superimposes the pointer on the position corresponding to the received operation on the image displayed on the display unit 111. In addition, the display control unit 231 sets the mode information to the operation mode indicating that the mode is the operation mode according to the fact that the operation to another input device is received. For example, a mouse or a keyboard can be included in the examples of another input device.

The display control unit 231 outputs the position information of the pointer indicating the position of the pointer and the mode information indicating the set operation mode or the handwriting mode to the first transmission control unit 233. The display control unit 231 may output the position information of the pointer and the mode information periodically, for example, for every second, to the first transmission control unit 233 regardless of the occurrence of the event.

In a case where the event of the input device occurs, the display control unit 231 collects the type of the input device. The display control unit 231 determines whether or not the type of collected input device is the handwriting device. In a case where the type is the handwriting device, the display control unit 231 superimposes and displays the pointer corresponding to the event on the position corresponding to the operation on the image displayed on the display unit 111. In addition, the display control unit 231 generates the event information indicating the content of the corresponding event on the position corresponding to the operation. That is, for example, when an operation for releasing a pen used in handwriting input is input after the handwriting input pointer is moved on the image displayed on the display unit 111, for example, the display control unit 231 ends the drawing of the line at the position where the pen is released and displays the line. In addition, the display control unit 231 sets the mode information to the handwriting mode indicating that the mode is handwriting mode according to the fact that the operation to the handwriting device is received.

In a case where the type is not the handwriting device, that is, another input device, the display control unit 231 superimposes and displays the pointer corresponding to the event on the position corresponding to the operation on the image displayed on the display unit 111. In addition, the display control unit 231 generates the event information indicating the content of the event on the position corresponding to the operation. That is, for example, when a clicking operation is input after the pointer of the mouse is moved on the image displayed on the display unit 111, the display control unit 231 generates event information indicating that the operation button at the position to which the pointer is moved is pressed. In addition, the display control unit 231 sets the mode information to the operation mode indicating that the mode is the operation mode according to the fact that the operation to another input device is received.

The display control unit 231 outputs the position information of the pointer indicating the position of the pointer, the mode information of the set operation mode or the handwriting mode, and the event information indicating the content of the occurred event to the first transmission control unit 233.

In other words, regarding the superimposed display of the pointer, the display control unit 231 displays the image received from the terminal device 50 on the display unit 111 regardless of the presence or absence of the event and type of the input device, and superimposes the pointer on the position corresponding to the operation on the image. In addition, the display control unit 231 may be integrated in the first transmission control unit 233.

When the position information of the pointer and the mode information are input from the display control unit 231, the first transmission control unit 233 transmits the input position information of the pointer and the mode information to the terminal device 50 via the communication unit 110 and the network N. When the position information of the pointer and the mode information are transmitted to the terminal device 50, the first transmission control unit 233 determines whether or not to end the image sharing with the terminal device 50. In a case where the image sharing is not ended, the first transmission control unit 233 continues to perform the image sharing. In a case where the image sharing is ended, the first transmission control unit 233 ends the transmission control processing.

In addition, when the position information of the pointer, the mode information and the event information are input from the display control unit 231, the first transmission control unit 233 transmits the input position information of the pointer and the mode information to the terminal device 50 via the communication unit 110 and the network N. Furthermore, the first transmission control unit 233 outputs the input event information to the second transmission control unit 234.

That is, when the operation to the input device for receiving the handwriting input is received, the first transmission control unit 233 transmits the position information of the pointer and the handwriting mode information indicating that the mode is the handwriting mode to the terminal device 50. In addition, in a case where the operation to another input device is received, the first transmission control unit 233 transmits the position information of the pointer and the operation mode information indicating that the mode is the operation mode to the terminal device 50.

When the event information is input from the first transmission control unit 233, the second transmission control unit 234 transmits the input event information to the terminal device 50 via the communication unit 110 and the network N. That is, when a specific operation by another input device is received, the second transmission control unit 234 transmits the information indicating the received specific operation to the terminal device 50. When the event information is transmitted to the terminal device 50, the second transmission control unit 234 determines whether or not to end the image sharing with the terminal device 50. In a case where the image sharing is not ended, the second transmission control unit 234 continues to perform the image sharing. In a case where the image sharing is ended, the second transmission control unit 234 ends the transmission control processing.

Figure 6:
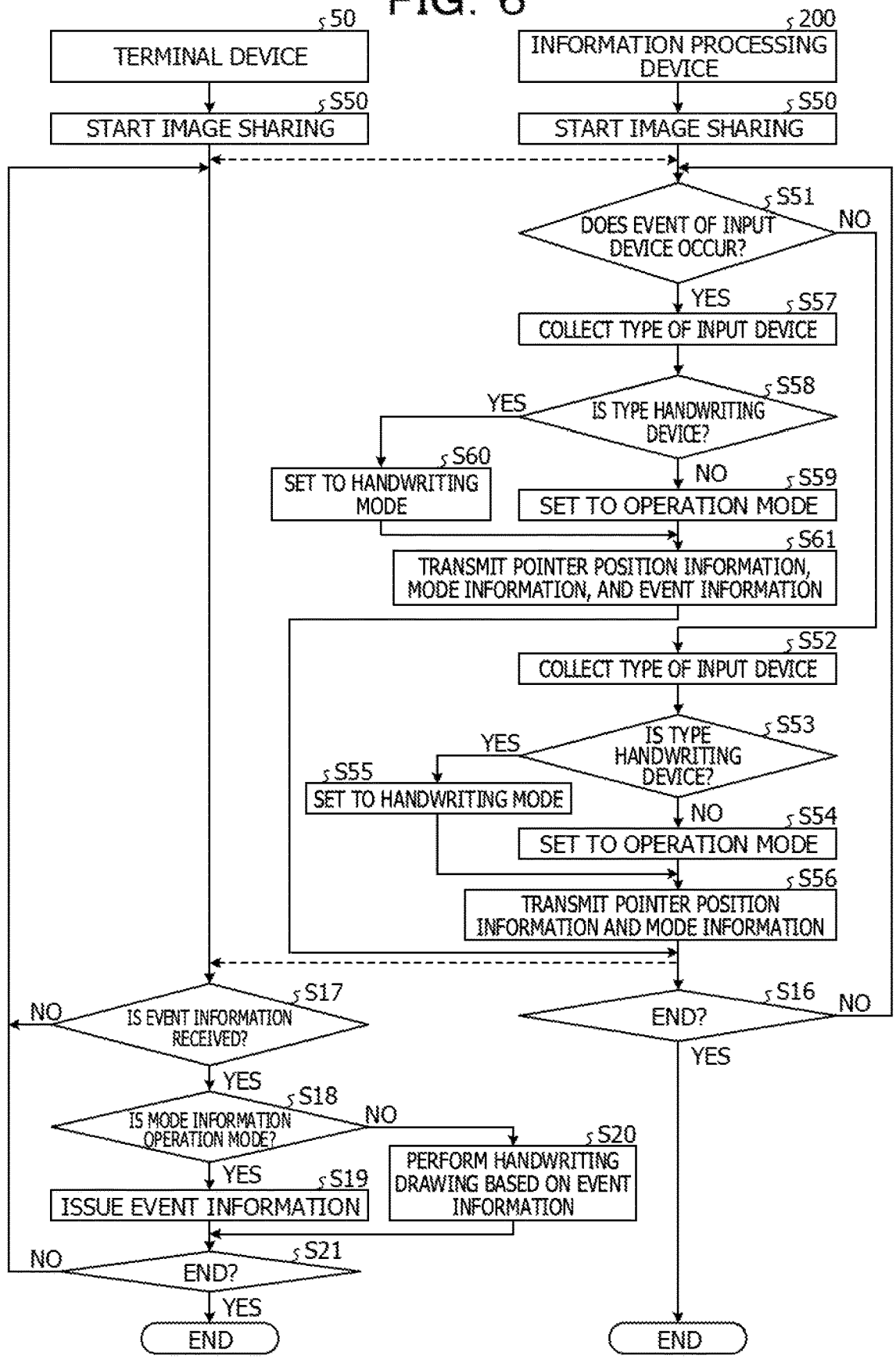
FIG. 6 is a sequence diagram illustrating an example of transmission control processing in the embodiment 2.

Next, an operation of the information processing system 2 in the embodiment 2 will be described. FIG. 6 is a sequence diagram illustrating an example of transmission control processing in the embodiment 2. In the description below, the processing items in STEPs S16 to S21 are similar to those in the embodiment 1, and the descriptions thereof will be omitted.

The terminal device 50 of the information processing system 2 receives an instruction to start the image sharing with the information processing device 200 from the worker who is the user. The terminal device 50 starts sharing the image on the screen with the information processing device 200 (STEP S50). When the image sharing with the terminal device 50 is started, the display control unit 231 of the information processing device 200 displays the image on the screen received from the terminal device 50 on the display unit 111.

The display control unit 231 monitors the position of the pointer input from the operation unit 112, that is, the input device. In addition, the display control unit 231 determines whether or not the event of the input device occurs (STEP S51). In a case where the event of the input device does not occur (NO in STEP S51), the display control unit 231 collects the type of the input device (STEP S52). The display control unit 231 determines whether or not the type of collected input device is the handwriting device (STEP S53).

In a case where the type is not the handwriting device (No in STEP S53), the display control unit 231 superimposes and displays the pointer on the position corresponding to the operation on the image displayed on the display unit 111. In addition, the display control unit 231 sets the mode information to the operation mode indicating that the mode is the operation mode according to the fact that the operation to another input device is received (STEP S54). The display control unit 231 outputs the position information of the pointer and the mode information to the first transmission control unit 233.

In a case where the type is the handwriting device (Yes in STEP S53), the display control unit 231 superimposes and displays the pointer on the position corresponding to the operation on the image displayed on the display unit 111. In addition, the display control unit 231 sets the mode information to the handwriting mode indicating that the mode is the handwriting mode according to the fact the operation to the handwriting device is received (STEP S55). The display control unit 231 outputs the position information of the pointer and the mode information to the first transmission control unit 233.

When the position information of the pointer and the mode information is input from the display control unit 231, the first transmission control unit 233 transmits the input position information of the pointer and the mode information to the terminal device 50 (STEP S56), and the process proceeds to STEP S16.

Returning to the description in STEP S51, in a case where the event of the input device occurs (Yes in STEP S51), the display control unit 231 collects the type of the input device (STEP S57). The display control unit 231 determines whether or not the type of the collected input device is the handwriting device (STEP S58).

In a case where the type is not the handwriting device (No in STEP S58), the display control unit 231 superimposes and displays the pointer corresponding to the event on the position corresponding to the operation on the image displayed on the display unit 111. In addition, the display control unit 231 generates the event information indicating the content of the corresponding event on the position corresponding to the operation. Furthermore, the display control unit 231 sets the mode information to the operation mode indicating that the mode is the operation mode according to the fact that the operation to another input device is received (STEP S59). The display control unit 231 outputs the position information of the pointer, the mode information and the event information to the first transmission control unit 233.

In a case where the type is the handwriting device (Yes in STEP S58), the display control unit 231 superimposes and displays the pointer corresponding to the event on the position corresponding to the operation on the image displayed on the display unit 111. In addition, the display control unit 231 generates the event information indicating the content of the corresponding event on the position corresponding to the operation. Furthermore, the display control unit 231 sets the mode information to the handwriting mode indicating that the mode is handwriting mode according to the fact that the operation to the handwriting device is received (STEP S60). The display control unit 231 outputs the position information of the pointer, the mode information and the event information to the first transmission control unit 233.

When the position information of the pointer, the mode information and the event information are input from the display control unit 231, the first transmission control unit 233 transmits the input position information of the pointer and the mode information to the terminal device 50. Furthermore, the first transmission control unit 233 outputs the input event information to the second transmission control unit 234. When the event information input from the first transmission control unit 233, the second transmission control unit 234 transmits the input event information to the terminal device 50 (STEP S61), and the process proceeds to STEP S16. In this way, the information processing device 200 can reduce the operational burden in the switching operation between the handwriting mode and the operation mode.

As described above, when the operation to the input device for receiving the handwriting input is received, the information processing device 200 superimposes the pointer on the position corresponding to the received operation on the image displayed on the display unit 111. In addition, the information processing device 200 transmits the position information of the pointer, the handwriting mode information indicating that the mode is the handwriting mode to the terminal device 50. In addition, when an operation to another input device is received, the information processing device 200 superimposes the pointer on the position corresponding to the received operation on the image displayed on the display unit 111. In addition, the information processing device 200 transmits the position information of the pointer and the operation mode information indicating that the mode is the operation mode to the terminal device 50. In addition, when a specific operation by another input device is received, the information processing device 200 transmits the information indicating the received specific operation to the terminal device 50. As a result, it is possible to reduce the operational burden in the switching operation between the handwriting mode and the operation mode.

In addition, the information processing device 200 displays the image received from the terminal device 50 on the display unit 111 and superimposes the pointer on the on the position corresponding to the operation on the image. As a result, the image sharing with the terminal device 50 can be performed and the operation can be performed on the shared image in the information processing device 200 side.

In each embodiment described above, the image sharing is performed between the terminal device 10 or 50 for one worker and the information processing device 100 or 200 for one supporter, but not limited thereto. For example, the image sharing and the remote support may be performed between the terminal device 10 or 50 for one worker and the information processing device 100 or 200 for a plurality of supporters. In addition, the image sharing and the remote support may be performed between the terminal device 10 or 50 for a plurality of workers and the information processing device 100 or 200 for one supporter. Furthermore, the image sharing and the remote support may be performed between the terminal device 10 or 50 for a plurality of worker and the information processing device 100 or 200 for a plurality of supporters.

In addition, each configuration element in each illustrated unit does not have to be physically configured as illustrated. That is, the specific form of distribution and integration of each unit is not limited to the illustrated form, and all or part of the form may be configured by being functionally or physically distributed or integrated in arbitrary units according to various loads, status of use and the like. For example, the first transmission control unit 133 and the second transmission control unit 134 may be integrated. In addition, each illustrated processing is not limited to an order described above, but may be performed simultaneously or performed by changing the order to the extent that the contents of the processing items do not conflict with each other.

Furthermore, all or an arbitrary part of various processing functions performed by each device may be performed by a CPU (or a micro computer such as MPU and a micro control unit (MCU)). In addition, it is needless to say that all or an arbitrary part, of various processing functions may be performed by a program that is analyzed and executed by a CPU (or a micro computer such as MPU and a micro control unit (MCU)), or by hardware on a wired logic.

Figure 7:
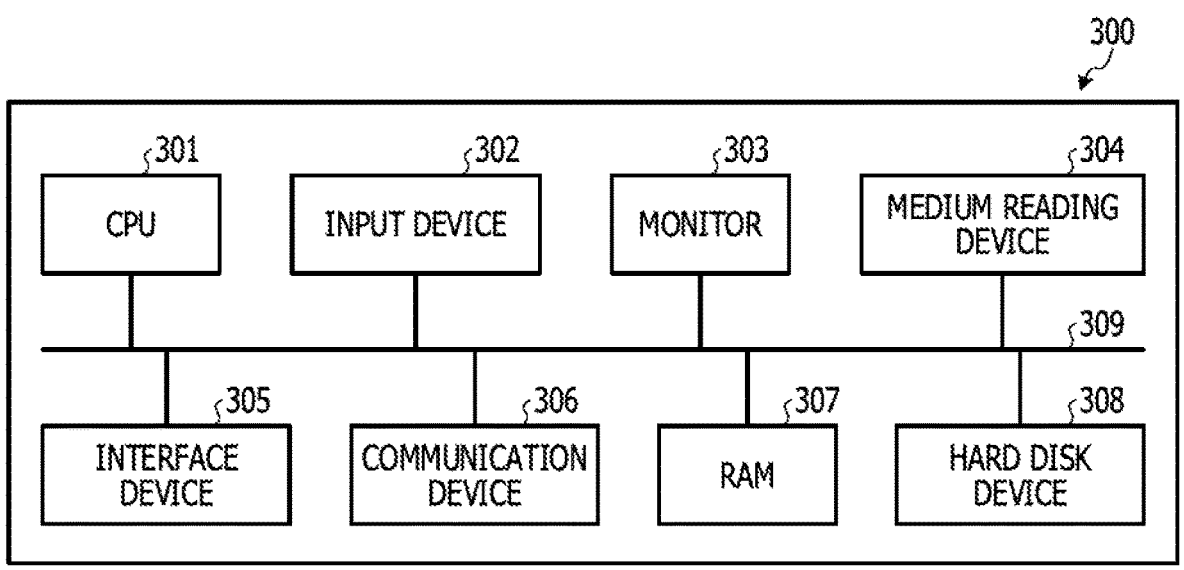
FIG. 7 is a diagram illustrating a computer that executes a transmission control program.

Incidentally, various processing items described in the above-described embodiments can be realized by executing a program provided in advance in a computer. Hereinafter, an example of a computer that executes a program having functions similar to those in the above-described embodiments will be described. FIG. 7 is a diagram illustrating an example of a computer that executes a transmission control program.

As illustrated in FIG. 7, a computer 300 includes a CPU 301 that executes various calculation processing items, an input device 302 that receives a data input, and a monitor 303. In addition, the computer 300 includes a medium reading device 304 that reads a program from a storage medium, an interface device 305 for various devices being coupled to, and a communication device 306 for other information processing devices or the like being wired or wirelessly coupled to. In addition, the computer 300 includes a RAM 307 that temporarily stores various information items and a hard disk device 308. In addition, each of the devices 301 to 308 is coupled to a bus 309.

A transmission control program having functions similar to those of each of the processing units such as the display control unit 131, the determination unit 132, the first transmission control unit 133 and the second transmission control unit 134 illustrated in FIG. 1, are stored in the hard disk device 308. In addition, a transmission control program having functions similar to those of each of the processing units such as the display control unit 231, the first transmission control unit 233 and the second transmission control unit 234 illustrated in FIG. 5 may be stored in the hard disk device 308. In addition, various data items for realizing the operation area storage unit 121 and the transmission control program are stored in the hard disk device 308. The input device 302 has a function similar to that of the operation unit 112 illustrated in FIG. 1 or FIG. 5, and receives input of various information items such as operation information from a user of the computer 300. The monitor 303 displays various screens such as a display screen or the like to the user of the computer 300. For example, a printing device or the like is coupled to the interface device 305. The communication device 306 has a function similar to that of the communication unit 110 illustrated in FIG. 1 or FIG. 5, and coupled to the terminal device 10 or 50 and exchanges various information items with the terminal device 10 or 50.

The CPU 301 performs various processes by reading each program stored in the hard disk device 308 and by deploying and executing the program in the RAM 307. In addition, these programs can cause the computer 300 to function as the display control unit 131, the determination unit 132, the first transmission control unit 133, and the second transmission control unit 134 illustrated in FIG. 1. In addition, these programs can cause the computer 300 to function as the display control unit 231, the first transmission control unit 233, and the second transmission control unit 234 illustrated in FIG. 5.

The above-described transmission control program does not have to be stored in the hard disk device 308. For example, a program stored in a computer 300 readable storage medium may be read and executed by the computer 300. A portable recording medium such as a CD-ROM, a DVD disk, or a universal serial bus (USB) memory, a semiconductor memory such as a flash memory and a hard disk drive are corresponding to the computer 300 readable storage medium. In addition, the transmission control program may be stored in a device coupled to public lines, the Internet, the LAN or the like, and the computer 300 may read the transmission control program from that device to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device configured to communicate with a terminal device, the information processing device comprising:
   an input device;
   a display device; and
   a processor coupled to the input device and the display device and configured to:
      receive, from the terminal device, image information for an image and area information identifying a first area of the image,
      display the image on the display device based on the image information,
      receive, by the input device, a first input signal,
      display, on the image displayed on the display device, a pointer on a position corresponding to the first input signal,
      determine a control mode of the terminal device based on whether the position of the pointer is included in the first area,
      when the position of the pointer is not included in the first area, transmit, to the terminal device, position information identifying the position of the pointer and first mode information identifying the control mode being a first mode, and
      when the position of the pointer is included in the first area,
         transmit, to the terminal device, the position information identifying the position of the pointer and second mode information identifying the control mode being a second mode different from the first mode, receive, by the input device, a second input signal, and transmit, to the terminal device, the second mode information, other position information, and operation information, the other position information identifying another position of the pointer in the first area at a timing of the second input signal, and the operation information identifying an operation specified by the second input signal in a state in which the another position of the pointer is included in the first area.

2. The information processing device according to claim 1, wherein the first mode is a mode in which drawing of the image is performed on the terminal device based on the position information transmitted to the terminal device, and the second mode is a mode in which the image is changed by the operation in the terminal device based on the operation information transmitted to the terminal device.

3. The information processing device according to claim 2, wherein:

the first mode is a handwriting mode, and the second mode is an operation mode.

4. The information processing device according to claim 3, wherein:

the first area is an area in which a content of one or a plurality of operations performed in the operation mode is displayed.

5. The information processing device according to claim 3, wherein:

the first mode information is transmitted to the terminal device in a case where the position of the pointer moves into the first area from an area other than the first area after the first mode information is transmitted to the terminal device.

6. An information processing device configured to communicate with a terminal device, the information processing device comprising:

a first input device;

a second input device;

a display device; and a processor coupled to the first input device, the second input device and the display device, and configured to:

receive image information from the terminal device, display an image on the display device based on the image information, determine, in response to receiving an input signal, a control mode of the terminal device based on whether the input signal is generated by the first input device or the second input device, when the input signal is generated by the first input device, transmit, to the terminal device, position information identifying a position of a pointer and first mode information identifying the determined control mode being a first mode, and when the input signal is generated by the second input device, transmit, to the terminal device, second mode information and operation information, the second mode information identifying the determined control mode being a second mode different from the first mode, and the operation information identifying an operation specified by the second input signal.

7. The information processing device according to claim 6, wherein:

the first input device is a touch pad, and the second input device is a mouse.

8. An information processing system comprising:

a terminal device; and an information processing device configured to communicate with the terminal device, wherein the information processing device includes:

an input device;

a display device; and a processor coupled to the input device and the display device and configured to:

receive, from the terminal device, image information for an image and area information indicating a first area of the image, display the image on the display device based on the image information, receive, by the input device, a first input signal, display, on the image displayed on the display device, a pointer on a position corresponding to the first input signal, determine a control mode of the terminal device based on whether the position of the pointer is included in the first area, when the position of the pointer is not included in the first area, transmit, to the terminal device, position information identifying the position of the pointer and first mode information identifying the control mode being a first mode, and when the position of the pointer is included in the first area, transmit, to the terminal device, the position information identifying the position of the pointer and second mode information identifying the control mode being a second mode different from the first mode, receive, by the input device, a second input signal, and transmit, to the terminal device, the second mode information, other position information, and operation information, the other position information identifying another position of the pointer in the first area at a timing of the second input signal, and the operation information identifying an operation specified by the second input signal in a state in which the another position of the pointer is included in the first area.

9. The information processing system according to claim 8, wherein the first mode is a mode in which drawing of the image is performed on the terminal device based on the position information transmitted to the terminal device, and the second mode is a mode in which the image is changed by the operation in the terminal device based on the operation information transmitted to the terminal device.

10. The information processing system according to claim 9, wherein:

the first mode is a handwriting mode, and the second mode is an operation mode.

11. The information processing system according to claim 10, wherein:

the first area is an area in which a content of one or a plurality of operations performed in the operation mode is displayed.

12. The information processing system according to claim 10, wherein:
   the first mode information is transmitted to the terminal device in a case where the position of the pointer moves into the first area from an area other than the first area after the first mode information is transmitted to the terminal device.

\* \* \* \* \*